United States Patent
Bartels et al.

(10) Patent No.: US 7,385,589 B2
(45) Date of Patent: Jun. 10, 2008

(54) PORTABLE INTERACTIVE DEVICE INTEGRATED WITH HOUSING AND MULTI-PURPOSE CLIP FOR PHYSICAL FITNESS ACTIVITY

(75) Inventors: Dirk Bartels, Cupertino, CA (US); Thomas Meyerhoffer, Montara, CA (US)

(73) Assignee: Companion Worlds, Inc., Belmont, CA (US)

( * ) Notice: Subject to any disclaimer, the term of this patent is extended or adjusted under 35 U.S.C. 154(b) by 622 days.

(21) Appl. No.: 10/826,662

(22) Filed: Apr. 15, 2004

(65) Prior Publication Data

US 2005/0231464 A1 Oct. 20, 2005

Related U.S. Application Data

(63) Continuation-in-part of application No. 10/801,497, filed on Mar. 15, 2004, and a continuation-in-part of application No. 10/758,712, filed on Jan. 15, 2004.

(51) Int. Cl.
*G09G 5/00* (2006.01)

(52) U.S. Cl. .................. 345/169; 345/156; 345/905

(58) Field of Classification Search ................ 345/156, 345/168–179, 184, 901, 903, 905; D14/324, D14/328, 344, 371–375; 248/166, 454; 361/681; 379/446, 454; 455/557, 575.6
See application file for complete search history.

(56) References Cited

U.S. PATENT DOCUMENTS

| 5,475,752 | A | * | 12/1995 | Mischenko | .................. 379/446 |
| 5,661,798 | A | * | 8/1997 | Chen | .......................... 379/454 |
| 6,125,513 | A | * | 10/2000 | Cheraso et al. | .............. 24/3.11 |
| 6,205,222 | B1 | * | 3/2001 | Carpenter | .................... 379/446 |
| 6,219,533 | B1 | * | 4/2001 | Richez | ..................... 455/575.6 |
| 6,278,779 | B1 | * | 8/2001 | Bryant et al. | ................ 379/446 |
| 2003/0064751 | A1 | * | 4/2003 | Charlier et al. | ............. 455/557 |
| 2003/0089832 | A1 | * | 5/2003 | Gold | .......................... 248/454 |

* cited by examiner

*Primary Examiner*—David L Lewis
(74) *Attorney, Agent, or Firm*—Perkins Coie LLP (57) ABSTRACT

A device is disclosed that provides a multifunctional clip mounted on a portable, programmable, interactive apparatus. One embodiment of the device comprises a housing configured to be carried by a user, a display for displaying information to the user, an interface operable by the user, and fixed-arm clip. The user may hold the device with one hand with the fixed arm clip while operating the interface with the same hand.

16 Claims, 8 Drawing Sheets

PORTABLE INTERACTIVE DEVICE INTEGRATED WITH HOUSING AND MULTI-PURPOSE CLIP FOR PHYSICAL FITNESS ACTIVITY

CROSS REFERENCE TO RELATED APPLICATIONS

This application claims the benefit and is a continuation-in-part of U.S. patent application No. 10/758,712, filed on Jan. 15, 2004, entitled, "COMMUNICATION SYSTEM AND PROTOCOL FOR INTERACTIVE PORTABLE DEVICE," by Lucas et al. and U.S. patent application No. 10/801,497, filed on Mar. 15, 2004, entitled, "INTERACTIVE MOBILE DEVICE," by Bartels, both of which are hereby incorporated by reference in their entirety.

FIELD OF THE INVENTION

The present invention relates to portable interactive computing devices, personal digital assistants, handheld computers, and the like. In particular, the present invention teaches a housing for an interactive device having a multi-purpose carrying clip and an easy to use interface. The clip and interface enable a user to carry and operate the portable interactive device with one hand.

BACKGROUND OF THE INVENTION

The portable computing device is ubiquitous. Specific examples include cellular telephones and personal digital assistants, as well as inventory, delivery services, and other mobile applications. One primary limitation is the failure of the interface to provide easy operation by a user. For example, the typical interface of the prior art portable computing device requires the use of both hands. The failings of the prior art portable computing device are perhaps no where more evident than in applications where the user is mobile, such as sporting activities, inventory taking, and delivery applications.

The past decade has invoked a dramatic increase in consumer spending in the field of health and fitness products and sporting equipment. In the United States alone, an estimated 50 million people work out at least 3 times a week, over 27 million people play golf, and approximately 1 million people receive some kind of physical therapy every day. This has resulted in a strong demand for devices and methods that assist individuals in setting and reaching fitness goals. The currently available devices and methods however, fail to meet the needs of average consumers in many ways. This is especially true in the field of portable devices that may accompany an individual during their workout.

For example, prior art devices capable of being carried with a user on their physical fitness workout are severely limited in function and portability. Many of these devices are incorporated into a wristwatch and are only capable of calculating a runner's speed, time and distance. Other functions may include a heart rate monitor that connects to the wristwatch device. There is little or no feedback from these current devices and methods. Further these devices can only function in one specific mode of operation. See U.S. Pat. No. 6,002,982 that describes a device used to aid a user in their fitness workout.

More sophisticated prior art devices that do allow for operator interactions are not portable and are usually mounted to the exercise equipment. For example, see U.S. Pat. No. 6,066,075 to Poulton. Poulton's patent details a computer apparatus that provides feedback to an individual while the individual is on a treadmill. The structures and sensors necessary in this type of device are not intended to be portable.

In addition to the failures of the above devices, conventional portable devices do not provide an adequate means by which the portable device may function or be transported in a variety of manners. For example, a conventional PDA (personal digital assistant) must be held in the hand of the user and cannot operate in a "stand alone" manner. There is also no convenient way to carry or interact with a conventional PDA during some type of physical activity.

Therefore there is a need for a multi-functional mechanism that would allow for a portable device to be easily transported, provide one hand operation, and function in a variety of modes.

SUMMARY OF THE INVENTION

The present invention improves on the prior art methods and devices by providing a clip that is mounted on a portable, programmable, interactive device that accompanies an individual. One embodiment of the present invention is a device that comprises a housing configured to be carried by a user, a display for displaying information to the user, an interface operable by the user to select and input data, and a fixed-arm clip mounted on the housing of the device. In preferred embodiments, the user can hold the portable device in one hand while operating the interface with that same hand.

DETAILED DESCRIPTION OF THE PREFERRED EMBODIMENTS

Figure 1:
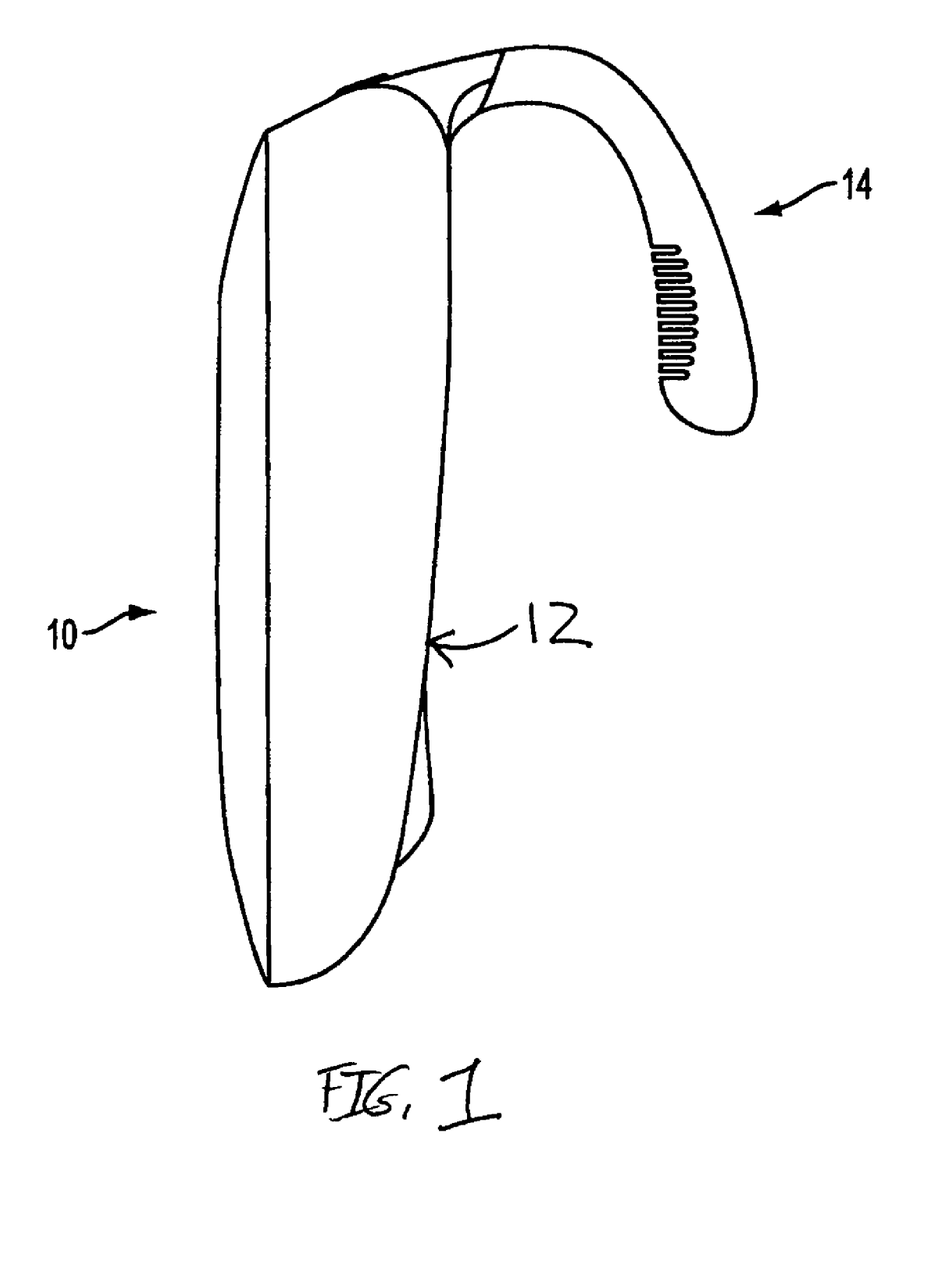
FIG. 1 is a side view of a portable interactive device having a fixed-arm clip in accordance with one embodiment of the present invention.
Figure 2:
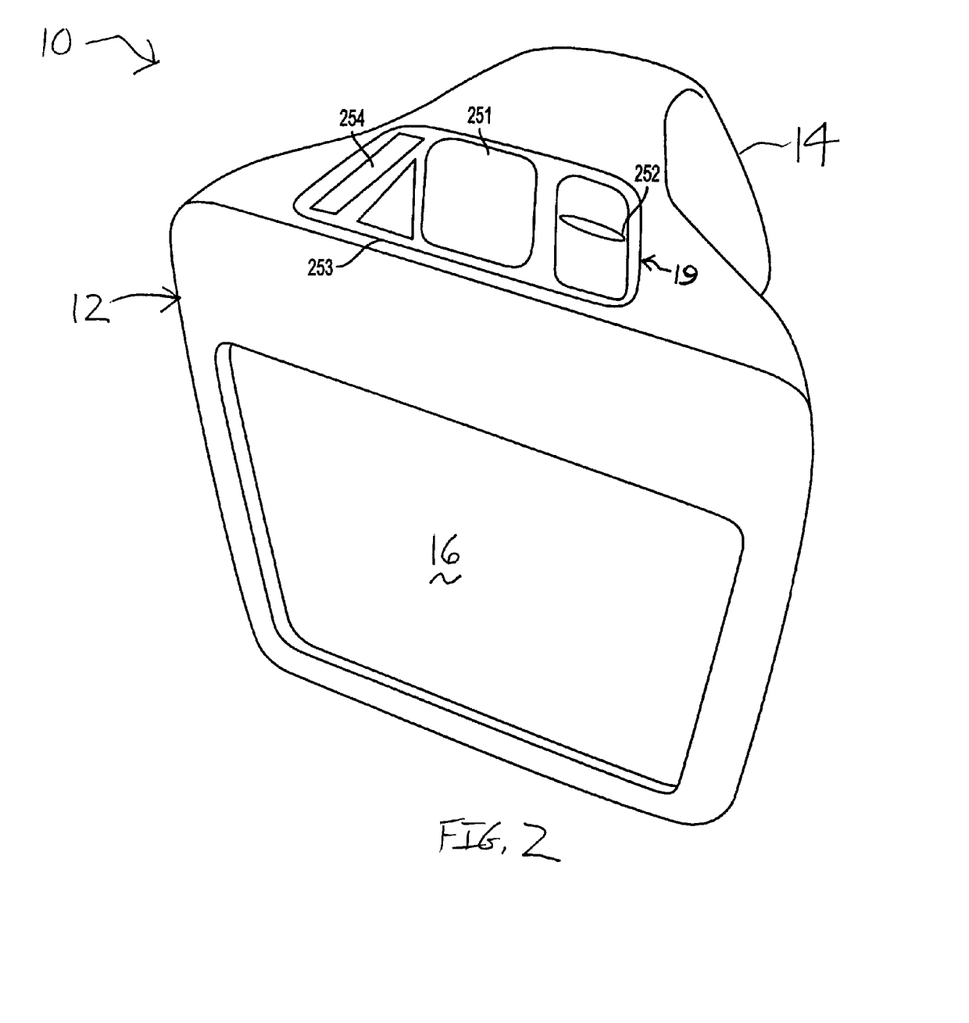
FIG. 2 is an isometric view of the portable interactive device of FIG. 1.

With reference to FIGS. 1-2, an interactive device 10 having a fixed-arm clip in accordance with one embodiment of the present invention will now be described. The interactive device 10 includes a housing 12, a fixed-arm clip 14, a display 16, and a push-button interface 19. The electronics of the device 10 are internal to the housing 12, one suitable embodiment of the electronics is described below with reference to FIG. 6. The display 16 may be any suitable electronic display, and may even provide touchscreen capabilities.

The fixed-arm clip 14 enables the user to simultaneously hold or hang the interactive device 10 and operate the push-button interface 19 with one hand. In certain embodiments the clip 14 has a rubber cover for a secure grip and feel. As shown below in FIG. 7, the clip 14 may also function as a stand for the device 10. The display 16 of the device 10 may be easily viewed when the device is placed on a flat surface supported by the clip 14. This allows the user to operate the device in a "hands free" manner. For example, the individual may practice or perform an exercise while watching a video clip of the exercise being performed.

Turning to FIG. 2, the operation of the push-button interface 19 will now be described. As will be appreciated, the push-button interface 19 is one possible configuration, the guiding principle being that the present invention contemplates an interface allowing a user single hand interaction with the device 10. Of course, other button arrangements may well serve this purpose, and additional controls can be provided on the device 10 as desired.

The push-button interface 19 includes control buttons and switches 251, 252, 253 and 254, all disposed on top of the device 10. Button 251 provides inputs for the "on," "enter," and "off" functions of the device. Switch 252 performs the "up" and "down" functions of moving a highlight bar throughout the various displays. The appropriate choice, once highlighted, may be selected using button 251. Button 253 is a "back" button as is conventional for switching to a previous display screen. Button 254 is a "menu" button for allowing the user to jump to a "menu" function as described below.

In the embodiment of FIG. 2, button 251 sits above the surface of the housing 12. Switch 252 is a toggle switch that is mounted below the surface of the device, where the top of the switch sticks up above the surface of the device. The "Back" button 253 is a small bar in-between buttons and also sticks above the surface of the device some. The "Menu" button 254 is level with the surface of the device.

Figure 3:
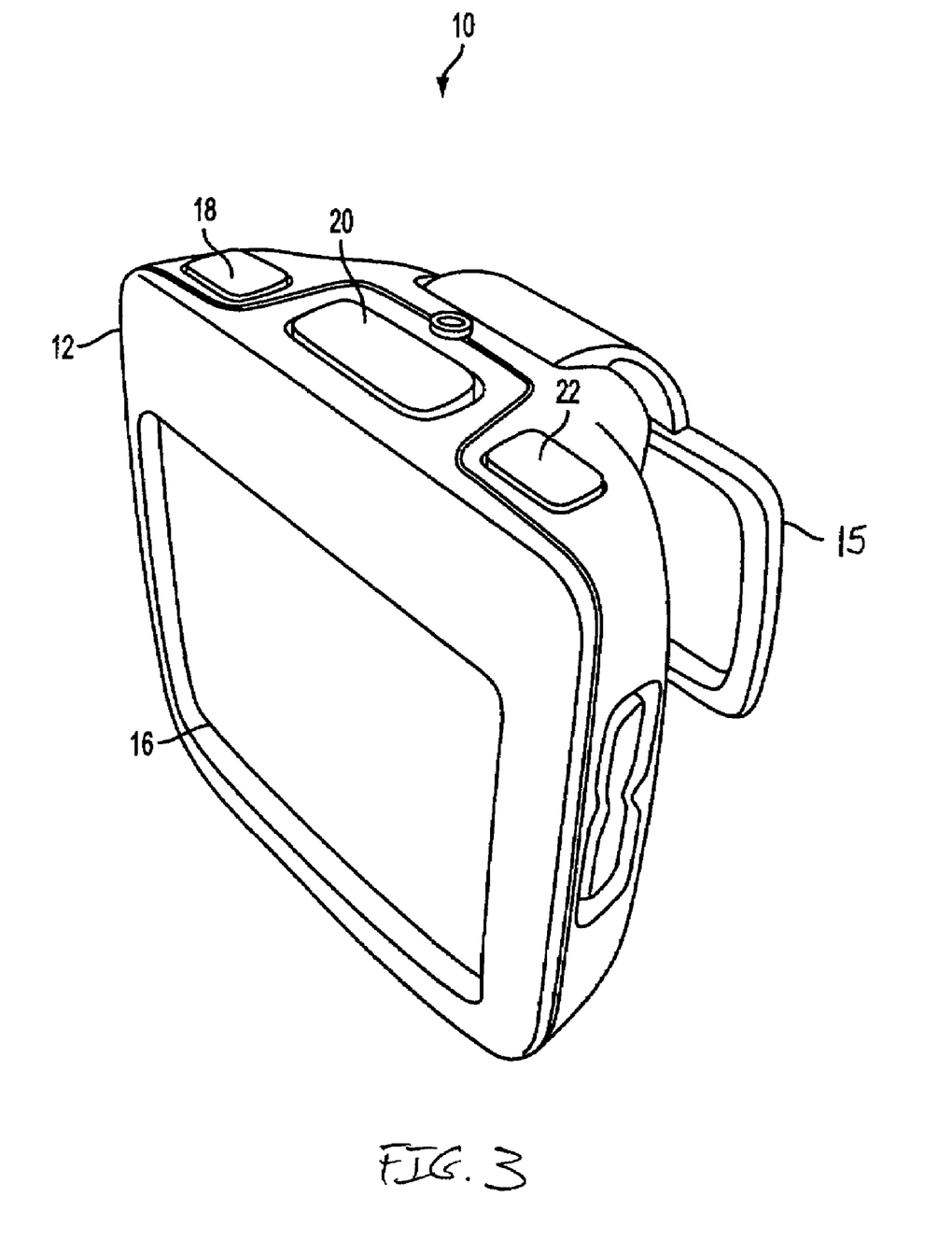
FIG. 3 is an isometric view of a portable interactive device having an adjustable clip in accordance with another embodiment of the present invention.

FIG. 3 illustrates one embodiment of an adjustable clip mounted on a portable programmable interactive device 10. The device 10 includes a case or housing 12 that contains and houses the necessary electrical components for operation of the device. An adjustable clip 15 is attached to the back of the device 10 which allows the portable device to be easily grasped for carrying or easily fastened to a belt of a user for example. A display 16 is arranged on the front of the case 12 so that the user can view information.

With further reference to FIG. 3, control buttons 18, 20 and 22 are provided for controlling the functions of the device 10. The device 10 is worn or carried by the user during mobile activity. This portability and ease of use make the device 10 particularly well suited for situations where the user has no access to a desktop PC or the Internet, e.g. Some recreational examples include a gym, a golf course or golf driving range, on a bicycle ride, on a sports ground, etc. Some commercial examples include product inventory, delivery services, doctor's office, etc.

Figure 4:
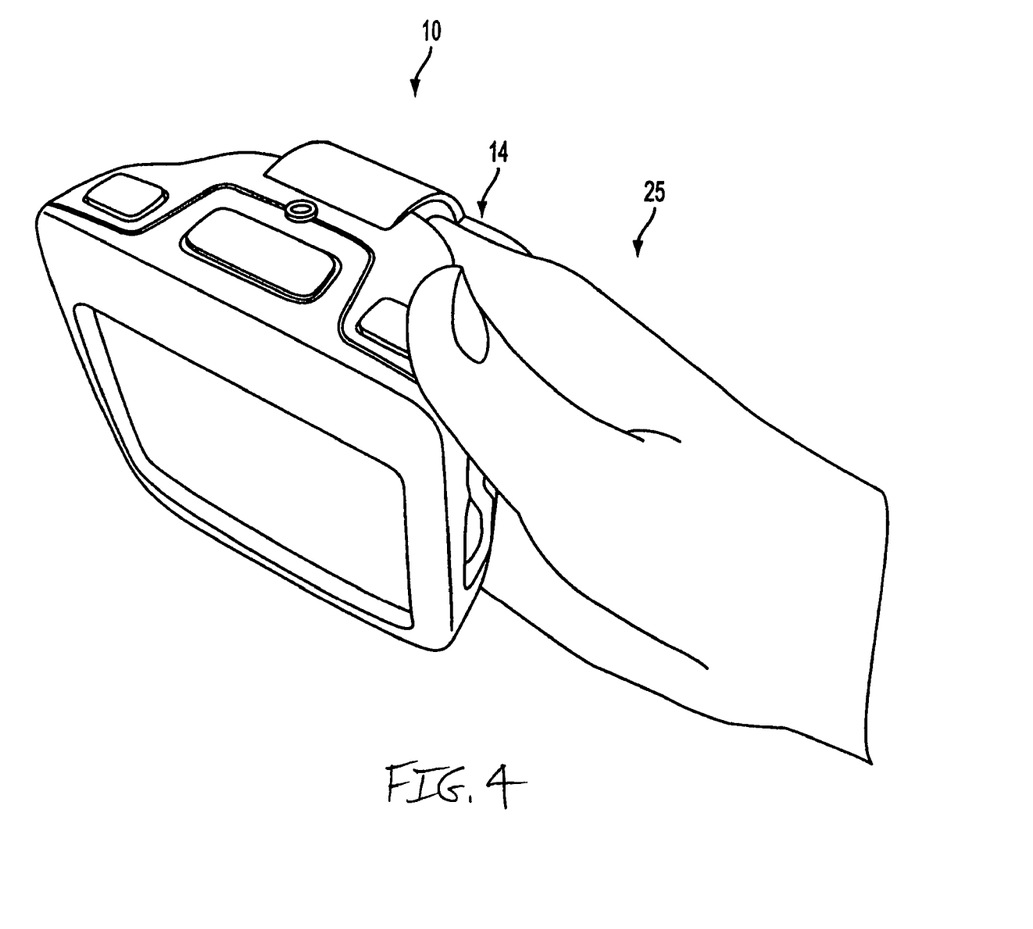
FIG. 4 is an isometric view of a portable interactive device being held and operated by one hand according to one aspect of the present invention.

FIG. 4 illustrates the compact size and portability of the device 10 of either embodiment found in FIGS. 1 or 3. A user's hand 25 easily grasps the device 10 with the aid of the fixed or adjustable clip 14 or 15. The clip provides a means to clip onto a user's belt for example. The clip may also be used as a stand in which the user may place the device 10 on a table and view the screen 16. As will be described below, the clip may be locked into place to allow for a variety of uses, dependent on the mode of operation of the device or the individual's preference.

Figure 5:
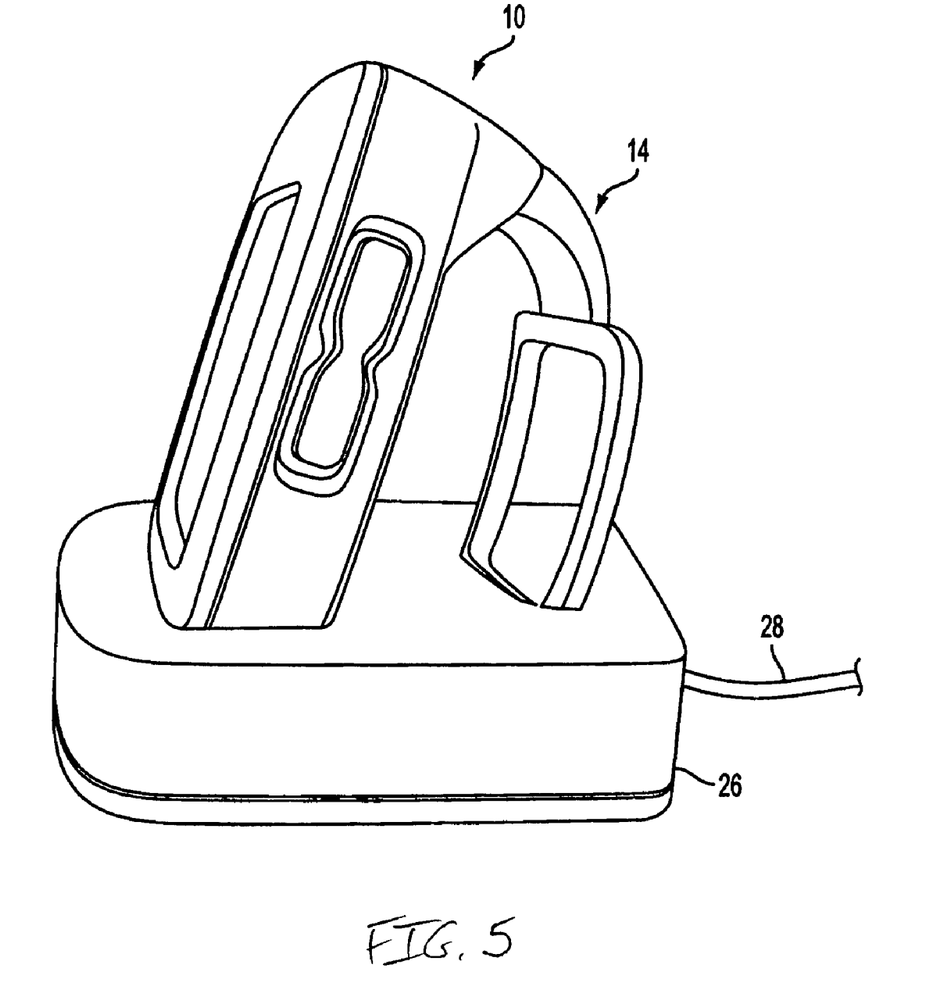
FIG. 5 shows a first embodiment of the present invention in a docking station.

According to certain embodiments of the present invention, the device 10 may be plugged into an external computer docking station 26 as shown in FIG. 5. When in the docking station 26, the device 10 may communicate with an external computer (not shown) by interconnecting a wire 28 between the external computer and the device 10. Other embodiments of the present invention include communications with local and remote computers using any of a variety of wired and wireless approaches such as Bluetooth or USB connections. While in docking station 26, the device 10 is capable of both sending and receiving data to an external computer.

One advantage of the present invention is that the docking station 26 allows the user access to a host of tools and information made available on the Internet. Instructional and motivational information, update information, contact information, inventory data, delivery data, etc. may be downloaded or uploaded while the device 10 is in the docking station. Once the necessary information is stored locally on the device 10, the device may be unplugged from the station 26 and again used as a portable device.

For purposes of this disclosure, the external computer described above is simply any suitable computing device, whether portable or stationary. This definition includes, but is not limited to, electronic books, laptop and handheld computers, and desktop computers. Using wireless types of communications for example, the monitoring device 10 may communicate with a web page running on a remote server via the Internet.

The device 10 may include cellular or other wireless or wired communication capability so as to interconnect with the Internet either continuously or periodically. For communication with a remote server, the device 10 may also include some type of memory chip or memory module that may be removed from the device 10 and inserted into the external computer for transfer of data. It is also a feature of the present invention that the user with the aid of an external computer may program the device 10. For example, the user's preferred workout and exercises may be entered via a keyboard connected to the external computer. The information is then transferred from the external computer into the local memory of the device 10. For more details pertaining to the communications protocols and connections with all types of external computer systems, see copending application Ser. No. 10/758,712 filed Jan. 15, 2004 entitled "Communication System and Protocol For An Interactive Portable Device", by Lucas et al., attorney docket number 41963-8002.

Figure 6:
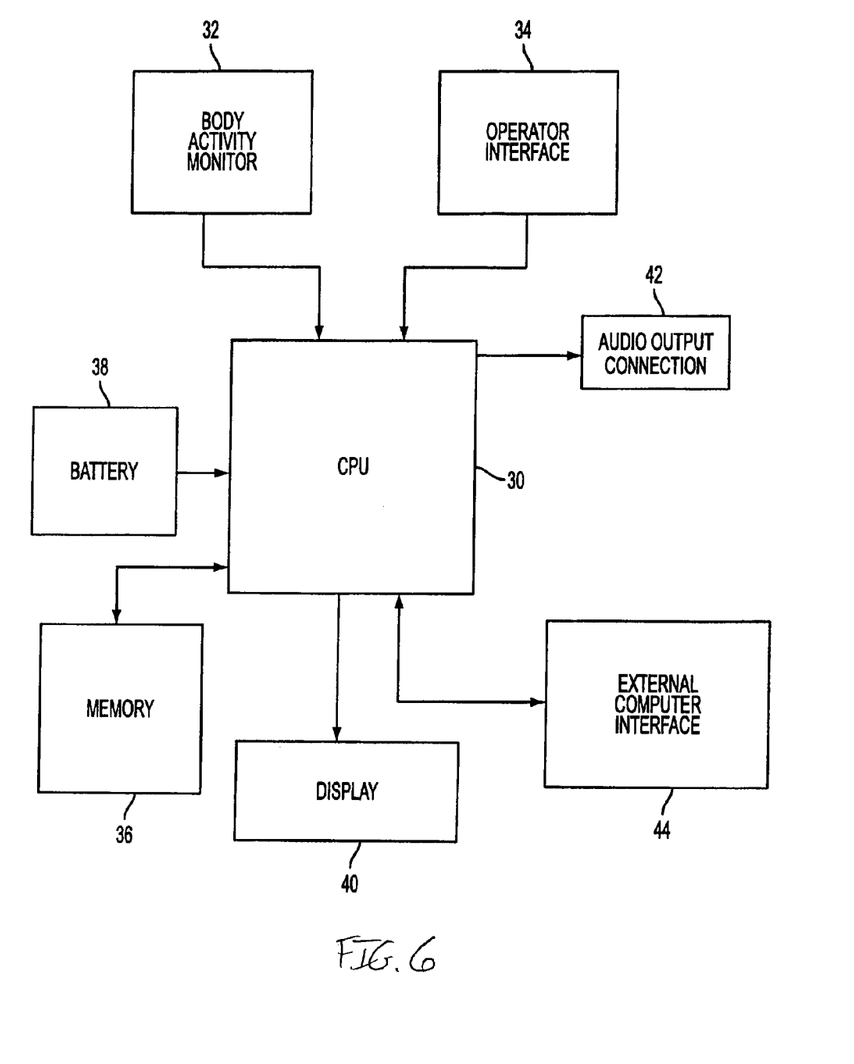
FIG. 6 is a schematic diagram of the device according to the present invention.

Referring now to FIG. 6, the circuitry contained in the device 10 for one embodiment of the present invention is illustrated schematically. As will be appreciated, the embodiment of FIG. 6 is particularly well suited to a portable device designed specifically for physical fitness and recreational applications. The device 10 includes a processor CPU 30 for processing and controlling the various components and functions. A body activity monitor 32 provides a signal indicative of the body activity of the subject to the CPU. In the one embodiment of the invention, the body activity monitor is a heart rate monitor. The operator interface 34 sends signals to the CPU 30 to perform the intended functions as selected by the user. In one preferred embodiment, the operator interface 34 consists mainly of controlling buttons located on the device itself and operable with one hand. However, in other embodiments a touch sensitive overlay may provide a touch screen interface allowing the user to enter data through touch.

A memory 36 is provided to store all types of data to perform the desired functions of the device. In the physical fitness or recreational application, this information may include the internal programs necessary for device operations, workout information, instructional information, motivational information and the user's personal statistics. However, the memory 36 will include whatever information is necessary for a given application. The memory 36 typically includes both persistent and transient memory. A battery 38 is also provided to power the device in remote locations. The CPU 30 provides the data to display 40 for viewing by the subject. The memory 36 is interconnected with the CPU 30 and allows storage of data that may be entered by the user through the operator interface 34 or downloaded from an external computer through the external computer interface 44.

Communications with external devices is provided through communications interface 44. This interface may be located in the device itself or may be provided in the docking station 26 as shown in FIG. 6. The communications interface 44 may also be a wired or wireless interface. An audio output connection 42 is provided for connection of external speakers or headphone for playing audio instructions and music. The circuitry of the device 10 may also include other input devices such as a barcode reader, an infrared port, a scanning device, etc.

Figure 7:
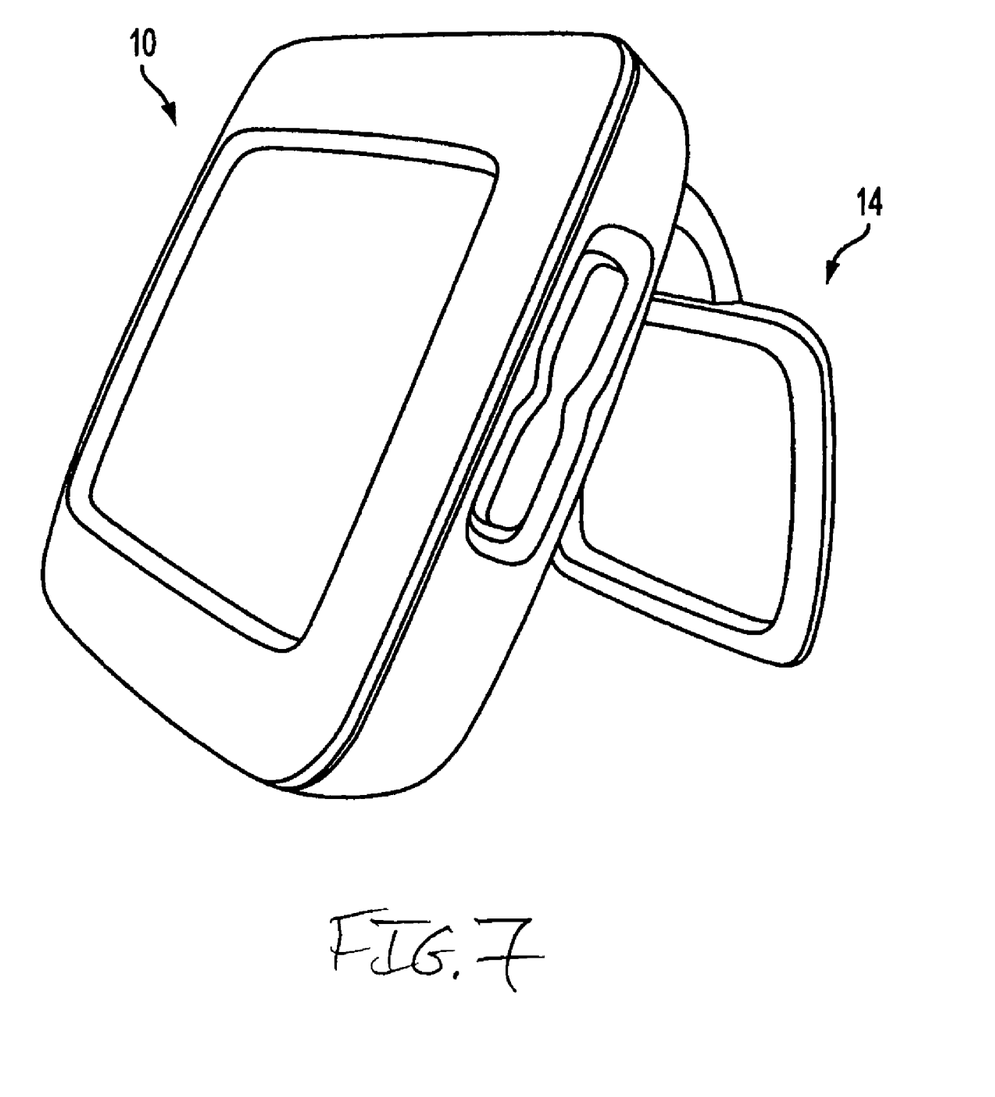
FIG. 7 illustrates a clip acting as a stand for a portable interactive device according to another aspect of the present invention.

FIG. 7 shows another disposition of the device 10, wherein the clip acts as a stand for the device. The fixed-arm clip 14 can be designed to act as a stand in its fixed form. Alternatively, the adjustable clip 15 may be adjustable into one or more positions for providing stand support for the device 10. This is ideal for setting the device 10 on a table for example, and viewing instructional data. This position of the device 10 is also desirable for playing music while working out, for viewing motivational information while performing an exercise, for viewing inventory or delivery data while working, etc.

Figure 8A:
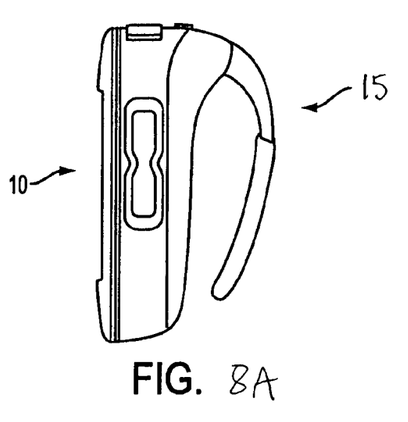
FIGS. 8A, 8B, 8C, and 8D show different positions of an adjustable clip of the present invention.
Figure 8B:
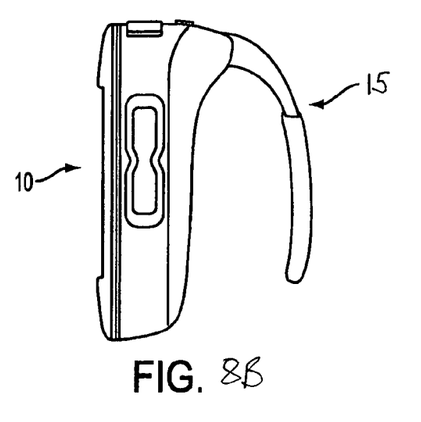
Figure 8C:
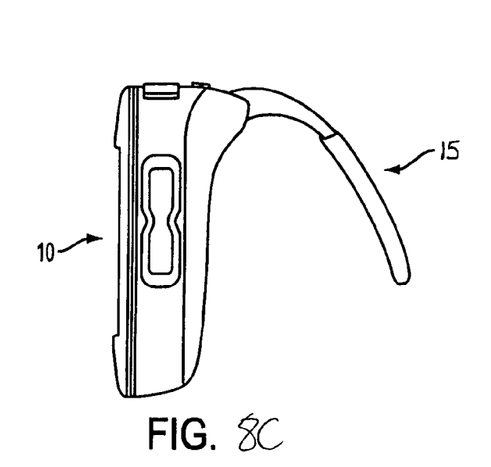
Figure 8D:
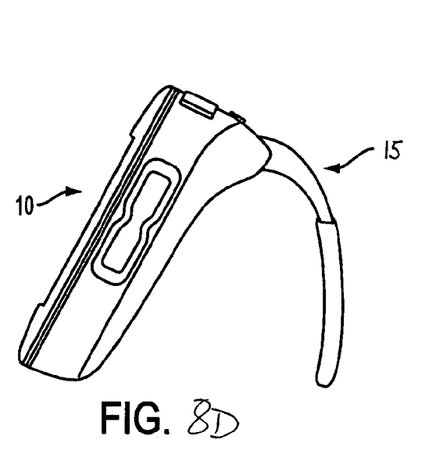

FIGS. 8A, 8B, 8C and 8D show a first, second, third and fourth positions of the adjustable clip 15. The first position of the clip 15 shown in FIG. 6A, would be used to attach the device to a belt for example. The second position of the clip 15 shown in FIG. 8B is ideal for aiding the user to grasp the device in his hand. The third position of the clip 15 shown in FIG. 8C would be used to fit the device 10 into the docking station as shown in FIG. 5. In FIG. 8D the clip operates as a stand for the device 10. Although these four positions are shown, the adjustable clip 15 may be positioned in any number of positions with varying angles relative to the device 10 in accordance with the individual's needs. As described below the device 10 may function in a variety of modes and these modes may be enacted with the adjustable clip in any position.

The adjustable clip of the present invention may be in any of the four positions as shown in FIGS. 8A through 8D. Depending on the preference of the user, the user may desire to interact with the main menu function while holding the device in his hand (with the clip in a first position), or the user may interact with the device standing upright, with the clip position adjusted accordingly.

The described embodiments relating to the clip features of the portable device are to be considered as illustrative and not restrictive. The invention is not to be limited to the details given herein, but may be modified within the scope of the appended claims.

The invention claimed is:

1. A portable interactive device integrated with a housing for physical fitness activity, said device comprising: an integrated housing including:

a fixed-arm clip formed coupled to a back of said housing, wherein said fixed-arm clip acts as a stand for said portable interactive device, allows said portable interactive device to be held in one hand by a user, and allows said portable interface device to be attached to another article; and a user interface formed into said housing, said user interface providing controls for said portable interactive device, said user interface arranged such that said user may operate said controls with said one hand while holding said portable interactive device with said one hand;

a memory for storing data relating to programs, workouts, exercises and user inputted data;

a processor in communication with a display, a storage, an interface, and said memory operable to control said display and to control said storage and retrieval of data from said memory;

said device interface includes an enter button, an up/down button, a menu button and a back button;

said device displays physical fitness information; and said device in said housing is operable to mount into a docking station.

2. A device as recited in claim 1, wherein said fixed-arm clip includes a rubber cover around said fixed-arm clip providing a secure grip.

3. A device as recited in claim 1, wherein said fixed-arm clip is arranged such that said portable interactive device is suitable for hanging from said one hand.

4. A device as recited in claim 3, wherein said one hand fits between said fixed-arm clip and said back of said housing.

5. A device as recited in claim 1, wherein said fixed-arm clip may strap onto a belt of said user.

6. A device as recited in claim 1, wherein said user interface includes a plurality of buttons.

7. A device as recited in claim 6, wherein at least one of said plurality of buttons has a profile substantially flush with a surface of said housing.

8. A device as recited in claim 6, wherein at least one of said plurality of buttons is a toggle switch extending out from a surface of said housing.

9. A portable interactive device enabling a user to perform a mobile activity, said device comprising:

an integrated housing configured to be transported by said user, said housing including:

a fixed-arm clip formed on a back of said housing, wherein said fixed-arm clip acts as a stand for said portable interactive device, allows said portable interactive device to be held in one hand by a user, and allows said portable interface device to be attached to another article; and a user interface formed into said housing, said user interface providing controls for said portable interactive device, said user interface arranged such that said user may operate said controls with said one hand while holding said portable interactive device with said one hand;

a display for displaying information to said user;

a memory for storing data relating to said mobile activity; and a processor in communication with said display, said user interface, and said memory, said processor operable to control said display and to control said storage and retrieval of data from said memory.

10. A portable interactive device as recited in claim 9, wherein said one hand fits between said clip and said back of said housing.

11. A portable interactive device as recited in claim 9, wherein said fixed-arm clip may strap on to a belt of said user.

12. A portable interactive device as recited in claim 9, wherein said housing is operable to mount into a docking station.

13. A portable interactive device as recited in claim 12, wherein said user may access an external computer while said device is in said docking station.

14. A portable interactive device as recited in claim 13, wherein said user may access the Internet while said device is in said docking station.

15. A portable interactive device as recited in claim 9, wherein said mobile activity is a physical fitness activity.

16. A portable interactive device as recited in claim 15, wherein a heart rate monitor is connected to said device.

* * * * *